United States Patent
Goncalves et al.

(10) Patent No.: US 12,503,242 B2
(45) Date of Patent: Dec. 23, 2025

(54) AIRCRAFT COMPRISING AT LEAST ONE COWL HAVING TWO PARTS MOVABLE RELATIVE TO EACH OTHER

(71) Applicant: Airbus Operations SAS, Toulouse (FR)

(72) Inventors: José Goncalves, Toulouse (FR); Nicolas Charton, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 18/793,151

(22) Filed: Aug. 2, 2024

(65) Prior Publication Data
US 2025/0042561 A1 Feb. 6, 2025

(30) Foreign Application Priority Data
Aug. 4, 2023 (FR) ...................................... 2308472

(51) Int. Cl.
B64D 29/06 (2006.01)
B64D 29/02 (2006.01)

(52) U.S. Cl.
CPC ............. *B64D 29/06* (2013.01); *B64D 29/02* (2013.01)

(58) Field of Classification Search
CPC ............ B64D 29/02; B64D 29/06; B64C 7/02
See application file for complete search history.

(56) References Cited

U.S. PATENT DOCUMENTS

| 5,203,525 A | 4/1993 | Remlaoui |
| 6,517,027 B1 | 2/2003 | Abruzzese |
| 2011/0091317 A1 | 4/2011 | Regard |
| 2015/0307198 A1* | 10/2015 | Guigon ................. B64D 27/40 244/55 |

FOREIGN PATENT DOCUMENTS

| CA | 2728700 A1 | 1/2010 |
| FR | 3009542 A1 | 2/2015 |

OTHER PUBLICATIONS

French Search Report for corresponding French Patent Application No. 2308472 dated Dec. 20, 2023.

* cited by examiner

*Primary Examiner* — Nicholas McFall
*Assistant Examiner* — Eric Acosta
(74) *Attorney, Agent, or Firm* — Greer, Burns & Crain, Ltd.

(57) ABSTRACT

An aircraft comprising at least one propulsion assembly and at least one pylon, the propulsion assembly comprising at least one cowl, connected by at least one first articulation to a fixed support, comprising a curved main part and a secondary lateral fairing which is positioned in the extension of a main lateral fairing of the pylon when the cowl is in the closed position. The secondary lateral fairing comprises at least first and second parts movable relative to each other, the first part being connected to the main part of the cowl.

10 Claims, 5 Drawing Sheets

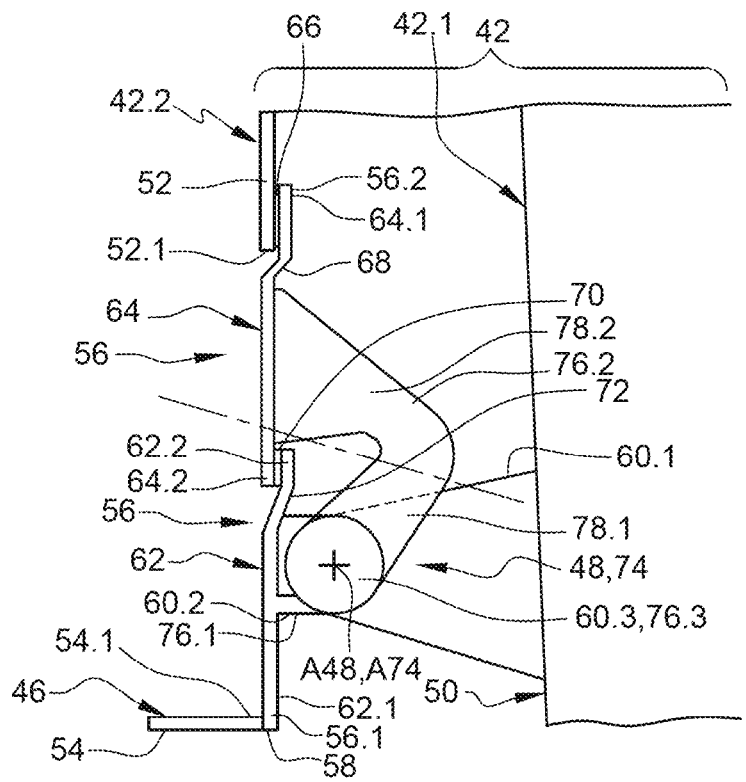

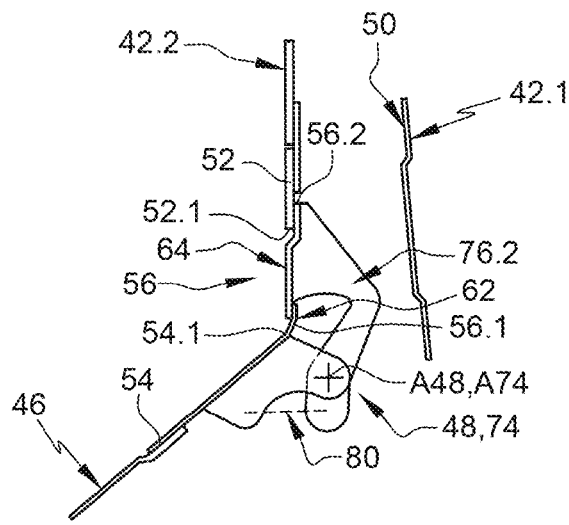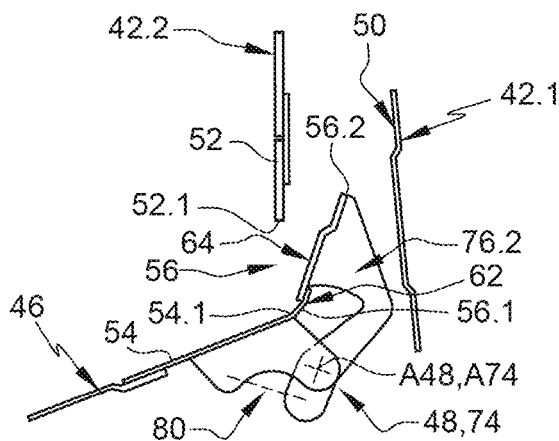
Fig. 10A  Fig. 10B
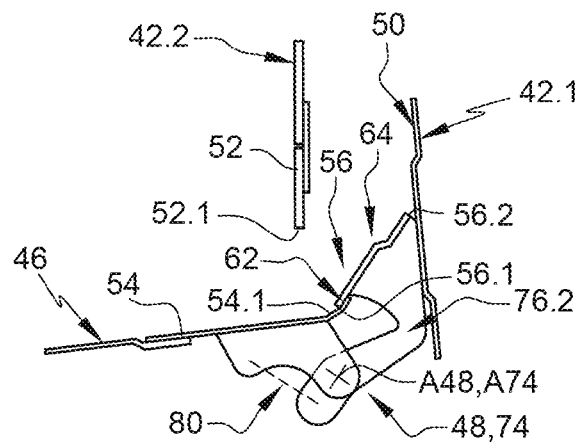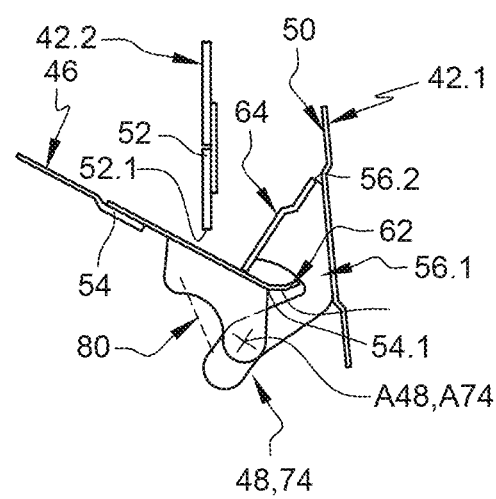
Fig. 10C  Fig. 10D

AIRCRAFT COMPRISING AT LEAST ONE COWL HAVING TWO PARTS MOVABLE RELATIVE TO EACH OTHER

CROSS-REFERENCES TO RELATED APPLICATIONS

This application claims the benefit of French Patent Application Number 2308472 filed on Aug. 4, 2023, the entire disclosure of which is incorporated herein by way of reference.

FIELD OF THE INVENTION

The present application relates to an aircraft comprising at least one cowl having two parts movable relative to each other.

BACKGROUND OF THE INVENTION

According to an embodiment visible in FIGS. 1 and 2, an aircraft 10 comprises a fuselage 12, a wing 14 and propulsion assemblies 16 positioned under the wing 14 and connected to the latter by pylons 18. Each propulsion assembly 16 comprises an engine 20 and a nacelle 22 positioned around the engine 20, said nacelle 22 comprising an air inlet 23 enabling the air inside the nacelle 22 to be channeled in the direction of the engine 20, a central part 24 and a rear part 26.

The engine 20 comprises an axis of rotation A20. For the remainder of the description, a longitudinal direction is a direction parallel to the axis of rotation A20 of the engine 20. A transverse plane is a plane perpendicular to the axis of rotation A20 of the engine 20. A vertical median plane is a vertical plane containing the axis of rotation A20 of the engine 20. The terms "front/rear" refer to the direction of flow of the airflow in the nacelle, which flows from front to rear.

As illustrated in FIGS. 3 and 4, each pylon 18 comprises a primary structure 18.1, ensuring the transmission of forces between the propulsion assembly 16 and the wing 14, and a secondary structure 18.2 forming a fairing around the primary structure 18.1. The primary structure 18.1 comprises two substantially (i.e., +/−10%) vertical lateral walls.

At its central part 24, the nacelle 22 comprises two cowls 28, 28' positioned on either side of the vertical median plane, each comprising an upper edge 28.1 connected by at least one articulation 30 to the primary structure 18.1 of the pylon 18, and a lower edge 28.2, each cowl 28, 28' being movable between a closed position (visible in FIG. 3), in which the lower edges 28.2 of the two cowls 28, 28' are contiguous, and an open position (visible in FIG. 4), in which the lower edge 28.2 of at least one of the cowls 28, 28' is spaced apart from the vertical median plane so as to allow access under the cowl 28, 28'.

Each articulation 30 comprises a pivoting connection having a pivot axis A30 substantially parallel to the longitudinal direction.

In line with each cowl 28, 28', the secondary structure 18.2 of the pylon 18 comprises a main lateral fairing 32 which is substantially vertical and slightly spaced apart from the primary structure 18.1 of the pylon 18, in particular from one of its lateral faces.

Each cowl 28, 28' has a curved main part 34 (following the profile of the nacelle 22) and a secondary lateral fairing 36, which is substantially planar and parallel to the lateral face of the primary structure 18.1, ensuring aerodynamic continuity between the main lateral fairing 32 of the pylon 18 and the main part 34 of the cowl 28, 28' when the latter is in the closed position. Thus, this secondary lateral fairing 36 comprises a lower edge 36.1 secured to the main part 34 of the cowl 28, 28' and an upper edge 36.2 cooperating with the lower edge 32.1 of the main lateral fairing 32 of the pylon 18 when the cowl 28, 28' is in the closed position.

As illustrated in FIGS. 3 and 4, since the pivot axis A30 is secured to the main part 34 of the cowl 28, the upper edge 36.2 of the secondary lateral fairing 36 is spaced apart from the pivot axis A30 and offset upward with respect to the latter.

When the cowl 28 is opened, the main part 34 and the secondary lateral fairing 36 pivot about the pivot axis A30 until the upper edge 36.2 of the secondary lateral fairing 36 is in contact with the lateral face of the primary structure 18.1 of the pylon 18, as illustrated in FIG. 4. According to this configuration, the cowl 28 can pivot by about 45 to 50° relative to a vertical plane, its opening movement being limited because of the contact of the upper edge 36.2 of the secondary lateral fairing 36 against the primary structure 18.1 of the pylon 18.

The fact that the cowl 28 cannot pivot further reduces accessibility to the equipment of the propulsion assembly 16 situated under the cowl 28.

One solution for increasing the pivoting angle of the cowl 28 consists in the secondary lateral fairing 36 of the cowl 28 being spaced apart from the primary structure 18.1 of the pylon 18. This solution is not satisfactory because it leads to the main lateral fairing 32 of the secondary structure 18.2 being spaced apart from the primary structure 18.1, which reduces the aerodynamic performance of the aircraft.

SUMMARY OF THE INVENTION

The present invention seeks to remedy all or some of the drawbacks of the prior art.

To this end, the subject of the invention is an aircraft comprising at least one propulsion assembly, a wing and at least one pylon connecting the propulsion assembly and the wing; the pylon comprising a primary structure and at least one main lateral fairing, the primary structure comprising two substantially vertical lateral faces, the propulsion assembly comprising at least one cowl connected by at least one first articulation to a fixed support, the cowl being movable between closed and open positions and comprising a curved main part and a secondary lateral fairing which comprises a lower edge secured to the main part of the cowl at a junction region and an upper edge configured to cooperate with the main lateral fairing of the pylon when the cowl is in the closed position, the main part and the secondary lateral fairing forming an angle greater than or equal to 60° between them in a transverse plane at the junction region, the secondary lateral fairing being substantially parallel to one of the lateral faces of the primary structure in the closed position.

According to the invention, the secondary lateral fairing comprises at least first and second parts movable relative to each other, the first part having a first lower edge corresponding to the lower edge of the secondary lateral fairing, and a first upper edge, the second part having a second upper edge corresponding to the upper edge of the secondary lateral fairing, and a second lower edge.

This solution makes it possible to prevent the first part of the secondary lateral fairing, which is fixed with respect to the cowl, from coming into abutment against the primary structure of the pylon when the cowl is open. This also makes it possible, if necessary, to increase the amplitude of the movement between the closed and open positions.

According to another feature, the second lower edge of the second part is configured to cooperate with the first upper edge of the first part.

According to another feature, the first and second parts of the secondary lateral fairing are connected by at least one articulation which has a pivot axis.

According to another feature, each first articulation comprises a pivot axis, the first and second pivot axes coinciding.

According to another feature, each second articulation comprises:
  at least one first wing secured to the first part and comprising a first through-hole,
  at least one second wing secured to the second part and comprising a second through-hole, and,
  a cylindrical rod, housed in the first and second through-holes in the first and second wings, forming the second pivot axis.

According to another feature, the second wing has a gooseneck shape so as to form with the second part a housing in which the first upper edge of the first part is positioned.

According to another feature, the second articulation comprises at least one return element configured to keep the first and second parts of the secondary lateral fairing substantially coplanar.

According to another feature, the first upper edge of the first part and the second lower edge of the second part are configured so as to overlap and be pressed, directly or indirectly, against each other when the cowl is in the closed position, the first upper edge of the first part being positioned between the second lower edge of the second part and the primary structure of the pylon.

According to another feature, the aircraft comprises at least one seal and/or shim positioned between the first upper edge of the first part and the second lower edge of the second part when the cowl is in the closed position.

According to another feature, the first part comprises a joggle close to its first upper edge so that the first and second parts of the secondary lateral fairing have outer faces which are substantially coplanar when the cowl is in the closed position.

BRIEF DESCRIPTION OF THE DRAWINGS

Other features and advantages will become apparent from the following description of the invention, which description is given solely by way of example, with reference to the appended drawings, in which:

FIG. 6 is a section of part of a pylon and of a cowl illustrating an embodiment of the invention, the cowl being in the closed position, FIG. 7 is a cross section of the pylon and of the cowl visible in FIG. 6, the cowl being in the open position, FIG. 10A shows a schematic section of the pylon and of the cowl illustrating an embodiment in the closed position, FIG. 10B shows a schematic section of the pylon and of the cowl shown in FIG. 10A with the cowl at a first position moving to the open position, FIG. 10C shows a schematic section of the pylon and of the cowl shown in FIG. 10A with the cowl at a second position moving to the open position, and FIG. 10D shows a schematic section of the pylon and of the cowl shown in FIG. 10A with the cowl in the open position.

DETAILED DESCRIPTION OF THE PREFERRED EMBODIMENTS

Figure 1:
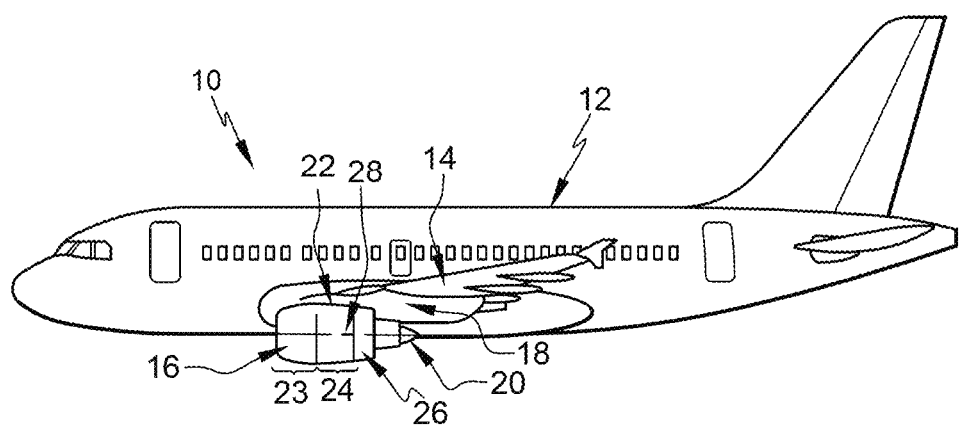
FIG. 1 is a side view of an aircraft.
Figure 2:
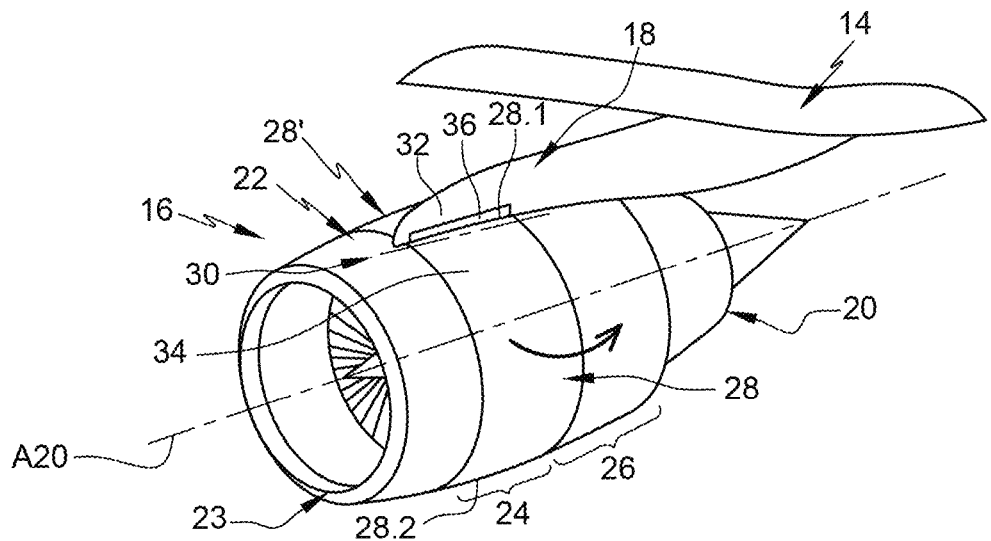
FIG. 2 is a perspective view of a propulsion assembly.
Figure 3:
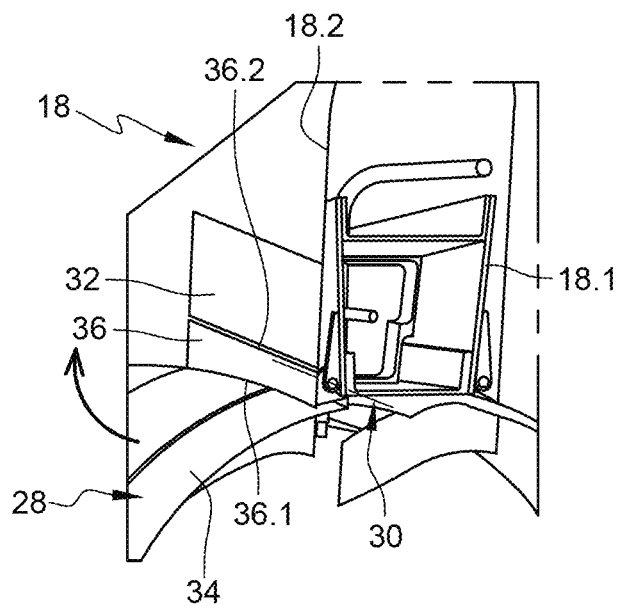
FIG. 3 is a perspective view of part of a pylon and of a propulsion assembly of an aircraft illustrating an embodiment of the prior art, the cowl being in the closed position.
Figure 4:
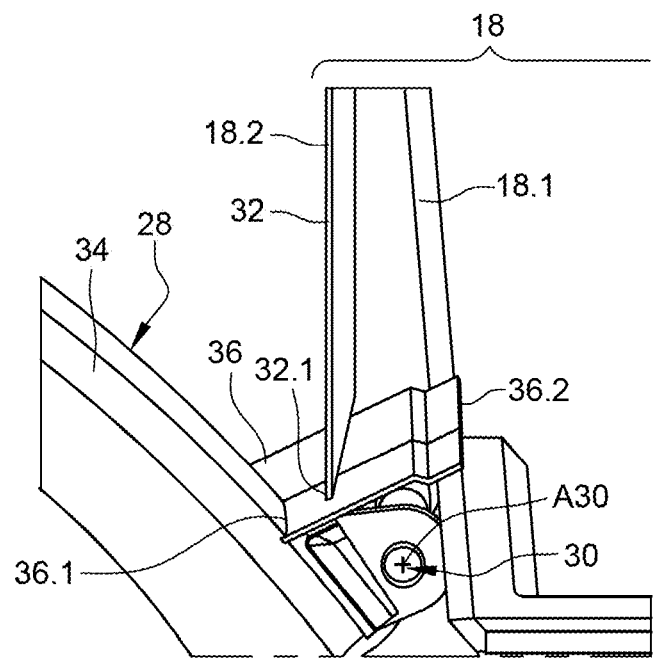
FIG. 4 is a cross section of the pylon and of the propulsion assembly visible in FIG. 3, the cowl being in the open position.
Figure 5:
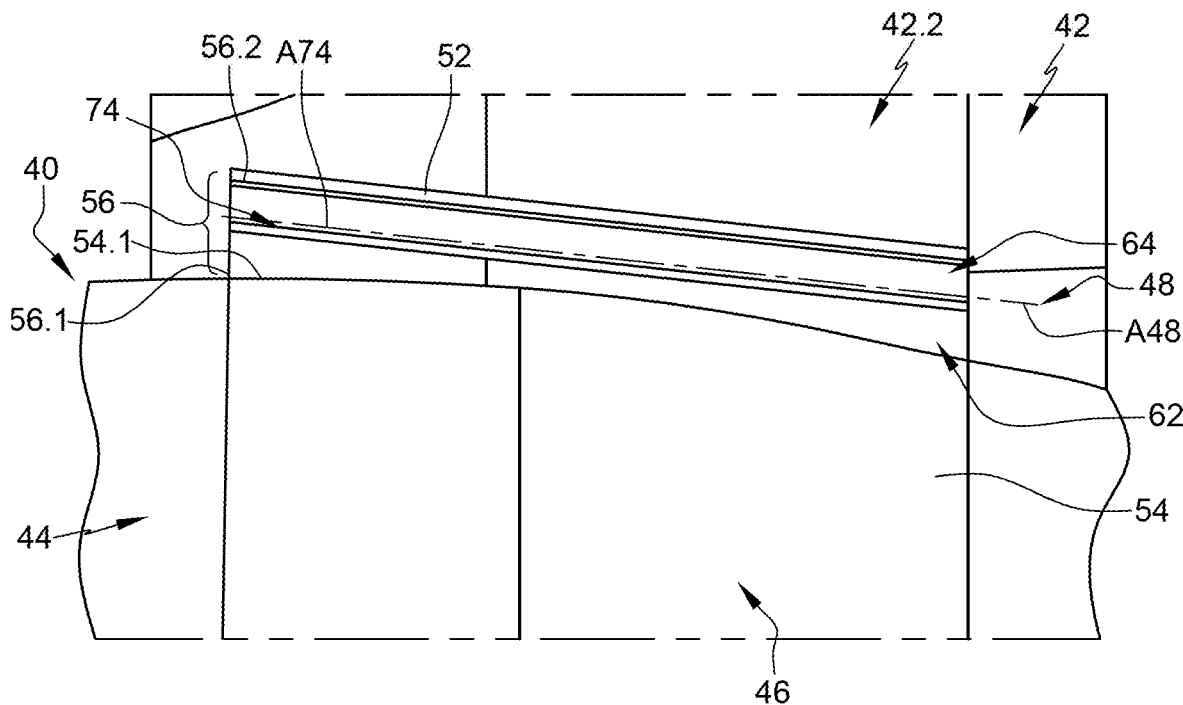
FIG. 5 is a side view of part of a pylon and of a propulsion assembly of an aircraft illustrating an embodiment of the invention.

As illustrated in FIG. 5, an aircraft comprises at least one propulsion assembly 40, a wing and at least one pylon 42 connecting the propulsion assembly 40 and the wing. The propulsion assembly 40 comprises a nacelle 44 surrounding an engine.

According to the embodiments visible in FIGS. 6 to 9, the pylon 42 comprises a primary structure 42.1, ensuring the transmission of forces between the propulsion assembly 40 and the wing, and a secondary structure 42.2 forming a fairing enveloping the primary structure 42.1. The primary structure 42.1 comprises two substantially vertical lateral faces positioned on either side of the vertical median plane.

The engine comprises an engine axis parallel to a longitudinal direction. The nacelle 44 has a vertical median plane passing through the engine axis.

The nacelle 44 comprises at least one cowl 46 connected by at least one first articulation 48 to a fixed support 50 (like the primary structure 42.1 of the pylon 42), the cowl 46 being movable between closed and open positions. According to one embodiment, the primary structure 42.1 or an element connected to the latter acts as the support 50.

According to one configuration, the nacelle 44 comprises two cowls 46, positioned on either side of the vertical median plane, each comprising a first edge connected by a first articulation 48 to the primary structure 42.1 of the pylon 42, and a second edge, each cowl 46 being movable between the closed position (visible in FIG. 6), in which the second edges of the two cowls are contiguous, and the open position (visible in FIG. 7), in which the second edge of at least one of the cowls 46 is spaced apart from the vertical median plane so as to allow access under the cowl 46.

At least in line with each cowl 46, the secondary structure 42.2 of the pylon 42 comprises at least one main lateral fairing 52 which is substantially vertical and parallel to the longitudinal direction, slightly spaced apart from the primary structure 42.1 of the pylon 42 and substantially parallel to the lateral face of the primary structure 42.1. This main lateral fairing 52 comprises a lower edge 52.1 configured to cooperate with the cowl 46.

With the exception of the cowl 46 and the first articulation 48, the other elements of the propulsion assembly 40 and of the pylon 42 are not described further since they may be identical to those of the prior art.

Each cowl 46 comprises a curved main part 54 (following the profile of the nacelle 44) and a substantially planar secondary lateral fairing 56 ensuring aerodynamic continuity between the main lateral fairing 52 of the pylon 42 and the main part 54 of the cowl 46 when the latter is in the closed position. In this position, the secondary lateral fairing 56 is substantially parallel to the lateral face of the primary structure 42.1. The main part 54 of the cowl has an outer surface in the continuity of the other outer surfaces of the nacelle 44 when the cowl 46 is in the closed position. The secondary lateral fairing 56 comprises a lower edge 56.1 secured to the main part 54 of the cowl 46 at a junction region 58 and an upper edge 56.2 configured to cooperate with the lower edge 52.1 of the main lateral fairing 52 of the pylon 42 when the cowl 46 is in the closed position, said upper edge 56.2 being spaced apart from the lower edge 52.1 of the main lateral fairing 52 of the pylon 42 when the cowl 46 is in the open position.

The main part 54 and the secondary lateral fairing 56 form an angle greater than or equal to 60° in a transverse plane and are preferably substantially perpendicular to each other at the junction region 58.

According to one embodiment visible in FIGS. 6 and 7, the main part 54 does not extend beyond the secondary lateral fairing 56 and has an upper edge 54.1 positioned in the extension of the secondary lateral fairing 56.

Figure 8:
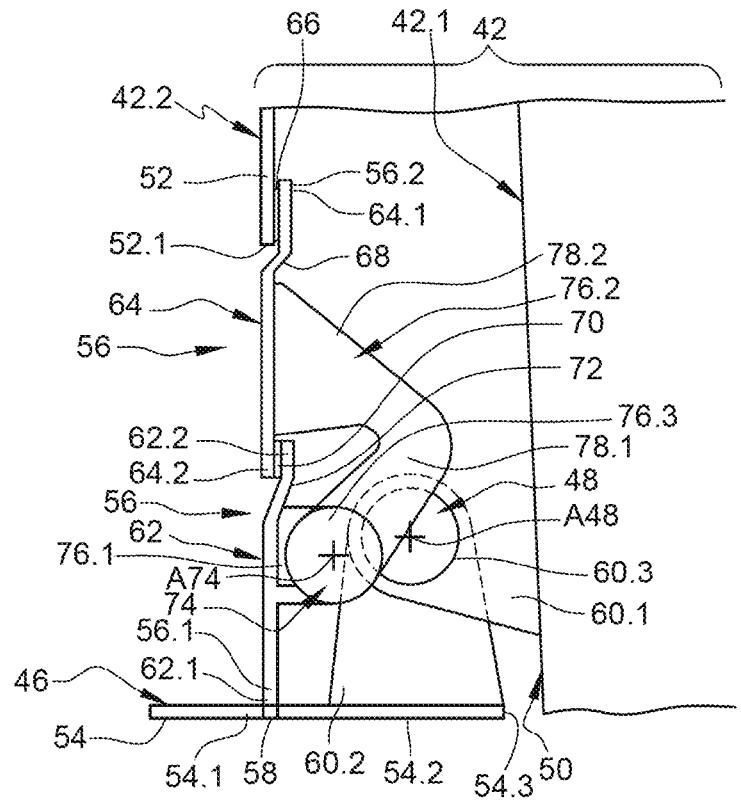
FIG. 8 is a section of part of a pylon and of a cowl illustrating another embodiment of the invention, the cowl being in the closed position.
Figure 9:
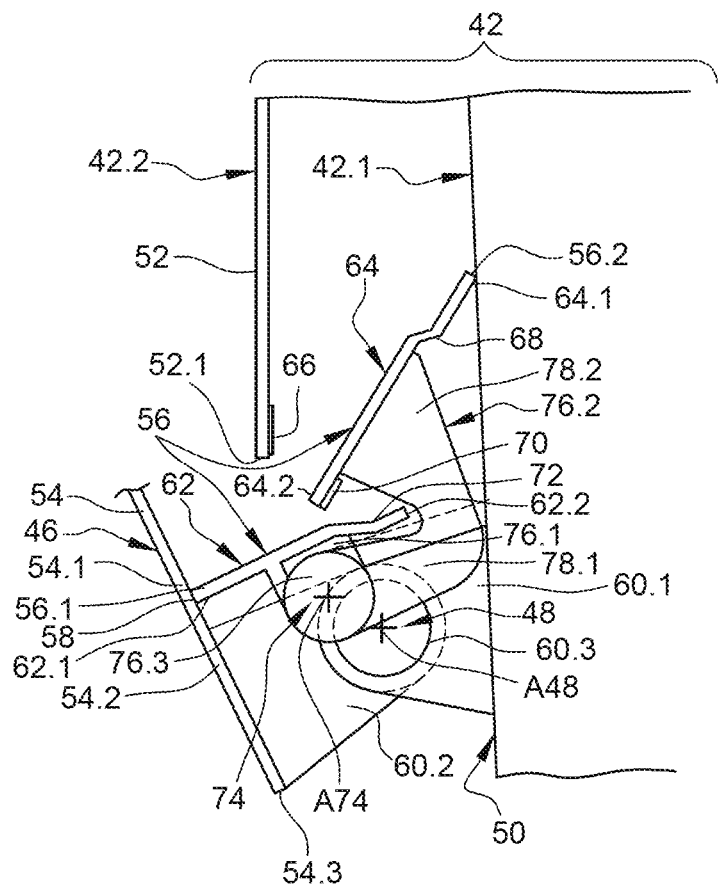
FIG. 9 is a cross section of the pylon and of the cowl visible in FIG. 8, the cowl being in the open position.

According to another embodiment visible in FIGS. 8 and 9, as in the prior art, the main part 54 comprises an extension 54.2 which extends beyond the secondary lateral fairing 56 and has an edge 54.3 spaced apart from the secondary lateral fairing 56.

Each first articulation 48 comprises a pivoting connection having a first pivot axis A48 substantially parallel to the longitudinal direction. According to one configuration, the cowl 46 is connected to the support by a plurality of first articulations 48 distributed along the longitudinal direction.

Each first articulation 48 comprises:
  at least one first wing 60.1, secured to the support 50, positioned in a plane perpendicular to the first pivot axis A48 and comprising a first through-hole,
  at least one second wing 60.2, secured to the cowl 46, positioned in a plane perpendicular to the first pivot axis A48 and comprising a second through-hole, and,
  a cylindrical rod 60.3, housed in the first and second through-holes in the first and second wings 60.1, 60.2, forming the first pivot axis A48.

According to one arrangement, the first wing 60.1 is fastened to the primary structure 42.1 of the pylon 42.

According to a first configuration visible in FIGS. 6 and 7, the second wing 60.2 is fastened to the secondary lateral fairing 56, close to the main part 54 of the cowl 46.

According to a second configuration visible in FIGS. 8 and 9, as in the prior art, the second wing 60.2 is fastened to the extension 54.2 of the main part 54, between the secondary lateral fairing 56 and the edge 54.3 of the extension 54.2.

According to one particular feature of the invention, the secondary lateral fairing 56 comprises at least first and second parts 62, 64 movable relative to each other, the first part 62 having a first lower edge 62.1 corresponding to the lower edge 56.1 of the secondary lateral fairing 56, and a first upper edge 62.2, the second part 64 having a second upper edge 64.1 corresponding to the upper edge 56.2 of the secondary lateral fairing 56, and a second lower edge 64.2. Each first articulation 48 is connected to the main part 54 and/or the first part 62 of the cowl 46. As illustrated in FIG. 10, the first part 62 may have a reduced height.

According to one configuration, the secondary lateral fairing 56 comprises first and second parts 62, 64, the second lower edge 64.2 of the second part 64 being configured to cooperate with the first upper edge 62.2 of the first part 62.

According to one arrangement, the second upper edge 64.1 of the second part 64, corresponding to the upper edge 56.2 of the secondary lateral fairing 56, is substantially parallel to the first pivot axis A48.

The first upper edge 62.2 of the first part 62 and the second lower edge 64.2 of the second part 64 are substantially parallel to the first pivot axis A48.

The first lower edge 62.1 of the first part 62, corresponding to the lower edge 56.1 of the secondary lateral fairing 56, follows the profile of the main part 54 of the cowl 46 and is not necessarily parallel to the first pivot axis A48.

According to one configuration, the lower edge 52.1 of the main lateral fairing 52 and the second upper edge 64.1 of the second part 64 of the secondary lateral fairing 56 are configured so that, when the cowl 46 is in the closed position (visible in FIG. 6), they overlap and are pressed, directly or indirectly, one against the other, the second upper edge 64.1 of the second part 64 being positioned between the lower edge 52.1 of the main lateral fairing 52 and the primary structure 42.1 of the pylon 42. According to one arrangement, the aircraft comprises at least one seal and/or shim 66 positioned between the lower edge 52.1 of the main lateral fairing 52 and the second upper edge 64.1 of the second part 64 of the secondary lateral fairing 56 when the cowl 46 is in the closed position. The seal (and/or the shim) 66 is (are) secured either to the lower edge 52.1 of the main lateral fairing 52 or to the second upper edge 64.1 of the second part 64 of the secondary lateral fairing 56.

According to one embodiment, the second part 64 comprises a joggle 68 close to its second upper edge 64.1 so that the outer faces of the main lateral fairing 52 and of the second part 64 of the secondary lateral fairing 56 are substantially coplanar when the cowl 46 is in the closed position.

According to one configuration, the first upper edge 62.2 of the first part 62 and the second lower edge 64.2 of the second part 64 are configured so as to overlap and be pressed, directly or indirectly, one against the other when the cowl 46 is in the closed position, the first upper edge 62.2 of the first part 62 being positioned between the second lower edge 64.2 of the second part 64 and the primary structure 42.1 of the pylon 42. According to one arrangement, the aircraft comprises at least one seal and/or shim 70 positioned between the first upper edge 62.2 of the first part 62 and the second lower edge 64.2 of the second part 64 when the cowl 46 is in the closed position. The seal (and/or the shim) 70 is (are) secured either to the first upper edge 62.2 of the first part 62 or to the second lower edge 64.2 of the second part 64.

According to one embodiment, the first part 62 comprises a joggle 72 close to its first upper edge 62.2 so that the outer faces of the first and second parts 62, 64 of the secondary lateral fairing 56 are substantially coplanar when the cowl 46 is in the closed position.

The first and second parts 62, 64 are interconnected by at least one second articulation 74 which comprises a pivoting connection having a second pivot axis A74 substantially parallel to the longitudinal direction. According to one configuration, the first and second parts 62, 64 are interconnected by a plurality of second articulations 74 distributed along the longitudinal direction.

According to one configuration visible in FIGS. 6 and 7, the first and second pivot axes A48, A74 coincide. According to this configuration, each second articulation comprises:
  at least one first wing 76.1 (coinciding with the second wing 60.2 of the first articulation 48), secured to the first part 62, positioned in a plane perpendicular to the second pivot axis A74 and comprising a first through-hole, at least one second wing 76.2, secured to the second part 64 of the secondary lateral fairing 56, positioned in a plane perpendicular to the second pivot axis A74 and comprising a second through-hole, and a cylindrical rod 76.3 (coinciding with the cylindrical rod 60.3 of the first articulation 48) housed in the first and second through-holes in the first and second wings 76.1, 76.2, said cylindrical rod 76.3 forming the second pivot axis A74.

Since the cylindrical rods 60.3, 76.3 are common to the first and second articulations 48, 74, the second part 64 is also connected by the articulation 74 to the support 50.

According to another configuration visible in FIGS. 8 and 9, the first and second articulations 48, 74 are distinct. According to this configuration, each second articulation comprises:

at least one first wing 76.1, secured to the first part 62, positioned in a plane perpendicular to the second pivot axis A74 and comprising a first through-hole, at least one second wing 76.2, secured to the second part 64 of the secondary lateral fairing 56, positioned in a plane perpendicular to the second pivot axis A74 and comprising a second through-hole, and, a cylindrical rod 76.3 housed in the first and second through-holes in the first and second wings 76.1, 76.2, said cylindrical rod 76.3 forming the second pivot axis A74.

According to one embodiment, the second wing 76.2 has a gooseneck shape so as to form with the second part 64 a housing in which the first upper edge 62.2 of the first part 62 is positioned. According to one embodiment, the second wing 76.2 has first and second portions 78.1, 78.2 forming a V, the first portion 78.1 being connected to the cylindrical rod 76.3 of the pivot axis A74, the second portion 78.2 being connected to the second part 64 while being spaced apart from the second lower edge 64.2. Thus, the first upper edge 62.2 of the first part 62 is positioned between the second lower edge 64.2 of the second part 64 and the first portion 78.1 of the second wing 76.2 of each articulation 74. According to this configuration, when the cowl 46 pivots from the closed position to the open position, the first part 62 of the secondary lateral fairing 56 pivots until it comes into contact with the first portion 78.1 of the second wing 76.2 of each articulation 74. Consequently, the pivoting of the cowl 46 causes the pivoting of the second part 64 of the secondary lateral fairing 56 until said second part 64 or the second wing 76.2 of at least one articulation 74 is in contact with the primary structure 42.1 of the pylon 42.

When the cowl 46 pivots from the open position to the closed position, the first part 62 of the secondary lateral fairing 56 pivots until it comes into contact with the second lower edge 64.2 of the second part 64. Consequently, the pivoting of the cowl 46 causes the pivoting of the first and second parts 62, 64 of the secondary lateral fairing 56 until the second part 64 is in contact with the main lateral fairing 52 of the pylon 42.

The provision of a secondary lateral fairing 56 in two parts 62, 64 movable relative to each other makes it possible to prevent the first part 62 of the secondary lateral fairing 56, which is fixed with respect to the cowl 46, from coming into abutment against the primary structure 42.1 of the pylon 42 when the cowl is open. This also makes it possible to increase the amplitude of the movement between the closed and open positions. Consequently, the cowl 46 can pivot through an angle much greater than 65° with respect to a vertical plane, which contributes to improving accessibility to the equipment of the propulsion assembly situated under the cowl 46.

According to one embodiment, the first and second parts 62, 64 of the secondary lateral fairing 56 and the second articulation 74 are configured so that the pivoting of the cowl 46 automatically generates pivoting of the second part 64 with respect to the first part 62. This solution makes it possible to automatically position the second part 64 in the extension of the first part 62 of the secondary lateral fairing 56 and of the main lateral fairing 52 of the pylon 42 when the cowl 46 tilts from the open position to the closed position of the cowl 46.

In a variant, as illustrated in FIGS. 10A to 10D, the second articulation 74 comprises at least one return element 80, such as a spring for example, configured to keep the first and second parts 62, 64 of the secondary lateral fairing 56 in contact with each other, as illustrated in FIGS. 10A to 10C, until the second gooseneck wing 76.2 is in contact with the support 50.

In FIG. 10A, the cowl 46 is in the closed position. At the start of the opening movement, as illustrated in FIG. 10B, the cowl 46 pivots. The first and second parts 62, 64 also pivot and remain in contact with each other by virtue of the return means 80. After a pivoting movement of around 35 to 40°, the second gooseneck wing 76.2 comes into contact with the support 50 (corresponding to the primary structure 42.1 of the pylon 42), as illustrated in FIG. 10C. Contrary to the prior art, the cowl 46 can still pivot until it reaches its maximum opening position, corresponding to a pivoting movement of around 68°, as illustrated in FIG. 10D. When the second wing 76.2 is in abutment against the support 50, the second part 64 remains immobile. Only the first part 62 and the main part 54 of the cowl pivot.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
at least one propulsion assembly,
a wing, and
at least one pylon connecting the at least one propulsion assembly and the wing, the at least one pylon comprising a primary structure and at least one main lateral fairing, the primary structure comprising two substantially vertical lateral faces,
the at least one propulsion assembly comprising at least one cowl connected by at least one first articulation to a fixed support, the at least one cowl being movable between a closed position and an open position and comprising a curved main part and a secondary lateral fairing which comprises a lower edge secured to the main part of the at least one cowl at a junction region and an upper edge configured to form a fairing wall with the main lateral fairing of the at least one pylon when the at least one cowl is in the closed position, the main part and the secondary lateral fairing forming an angle greater than or equal to 60° between them in a transverse plane at the junction region, the secondary lateral fairing being substantially parallel to one of the substantially vertical lateral faces of the primary structure in the closed position, wherein the secondary lateral fairing comprises a first part and a second part movable relative to each other, the first part having a first lower edge corresponding to the lower edge of the secondary lateral fairing, and a first upper edge, the second part having a second upper edge corresponding to the upper edge of the secondary lateral fairing, and a second lower edge.

2. The aircraft as claimed in claim 1, wherein the second lower edge of the second part is configured to further form the fairing wall with the first upper edge of the first part.

3. The aircraft as claimed in claim 2, wherein the first and second parts of the secondary lateral fairing are connected by at least one articulation which has a pivot axis.

4. The aircraft as claimed in claim 2, wherein the first upper edge of the first part and the second lower edge of the second part are configured to overlap and be pressed, directly or indirectly, one against the other when the cowl is in the closed position, the first upper edge of the first part being positioned between the second lower edge of the second part and the primary structure of the pylon.

5. The aircraft as claimed in claim 4, further comprising:
at least one seal, shim, or both positioned between the first upper edge of the first part and the second lower edge of the second part when the cowl is in the closed position.

6. The aircraft as claimed in claim 4, wherein the first part comprises a joggle near the first upper edge of the first part so that the first and second parts of the secondary lateral fairing have outer faces which are substantially coplanar when the cowl is in the closed position.

7. An aircraft comprising:
at least one propulsion assembly,
a wing, and
at least one pylon connecting the at least one propulsion assembly and the wing, the at least one pylon comprising a primary structure and at least one main lateral fairing, the primary structure comprising two substantially vertical lateral faces,
the at least one propulsion assembly comprising at least one cowl connected by at least one first articulation to a fixed support, the at least one cowl being movable between a closed position and an open position and comprising a curved main part and a secondary lateral fairing which comprises a lower edge secured to the main part of the at least one cowl at a junction region and an upper edge configured to form a fairing wall with the main lateral fairing of the at least one pylon when the at least one cowl is in the closed position, the main part and the secondary lateral fairing forming an angle greater than or equal to 60° between them in a transverse plane at the junction region, the secondary lateral fairing being substantially parallel to one of the substantially vertical lateral faces of the primary structure in the closed position, wherein the secondary lateral fairing comprises a first part and a second part movable relative to each other, the first part having a first lower edge corresponding to the lower edge of the secondary lateral fairing, and a first upper edge, the second part having a second upper edge corresponding to the upper edge of the secondary lateral fairing, and a second lower edge wherein the second lower edge of the second part is configured to further form the fairing wall with the first upper edge of the first part, wherein the first and second parts of the secondary lateral fairing are connected by at least one articulation which has a pivot axis, wherein the at least one articulation comprises first and second articulations each comprising a pivot axis, the pivot axis of the first articulation and the pivot axis of the second articulation coinciding.

8. The aircraft as claimed in claim 7, wherein each second articulation comprises at least one first wing secured to the first part and comprising a first through-hole, at least one second wing secured to the second part and comprising a second through-hole, and a cylindrical rod housed in the first through-hole in the at least one first wing and in the second through-hole in the at least one second wing and forming the second pivot axis.

9. The aircraft as claimed in claim 8, wherein the at least one second wing has a gooseneck shape so as to form with the second part a housing in which the first upper edge of the first part is positioned.

10. The aircraft as claimed in claim 7, wherein the second articulation comprises at least one return element configured to keep the first and second parts of the secondary lateral fairing substantially coplanar.

\* \* \* \* \*